3,431,217
ORGANIC PHOSPHOROUS ACID COMPOUND-
CHROMATE CORROSION PROTECTION IN
AQUEOUS SYSTEMS
Chih M. Hwa, Arlington Heights, Ill., assignor to W. R.
Grace & Co., New York, N.Y., a corporation of
Connecticut
No Drawing. Filed Sept. 22, 1966, Ser. No. 581,151
U.S. Cl. 252—389                                      6 Claims
Int. Cl. C23f 11/18, 11/12, 11/10

This invention relates to a method and composition for preventing corrosion of metal surfaces in contact with aqueous systems. The method comprises treating the aqueous systems with an organic phosphorous acid or salt and a chromate, and the composition is a mixture containing these components.

In summary, the composition of this invention is a stable corrosion inhibiting composition containing from 1 to 60% of a water-soluble inorganic chromate and from 40 to 99% based on the combined weight of the organic phosphorous acid compound and the chromate of a water-soluble organic phosphorous acid compound having the formula:

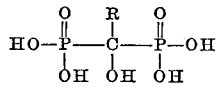

wherein R denotes an alkyl group having from 1 to 5 carbon atoms; alkali metal, alkali earth metal, zinc, cobalt, chromium, lead, tin, nickel, ammonium or ethanolamine salts of said compound; or mono- or dialkyl esters thereof with an aliphatic alcohol having from 1 to 4 carbon atoms.

In summary, the process of this invention is a method for treating water to prevent corrosion of metal surfaces in contact therewith comprising maintaining in the water from 0.1 to 200 p.p.m. of a water soluble inorganic chromate, and from 0.1 to 400 p.p.m. of the above organic phosphorous acid compound. The process of this invention also includes the use of non-ionic surface active agents in combination with the water-soluble inorganic chromate and organic phosphate compounds to treat the water.

Water-soluble inorganic chromates are widely used to treat industrial water systems to prevent corrosion of metal parts in contact therewith. When these chromates are employed alone, they are used in concentrations as low as 200 p.p.m. and as high as 10,000 p.p.m., depending upon the protection needed and the permissible cost. When these chromates are used in combinations with molecularly dehydrated inorganic phosphates such as disclosed in Patent No. 2,711,391, chromate concentrations as low as 5 p.p.m. have been found adequate in mild corrosive systems. Therefore, combinations of chromate and molecularly dehydrated phosphates are widely used.

The use of molecularly dehydrated inorganic phosphates in aqueous systems causes serious problems because the polyphosphates hydrolyze to form alkali earth metal orthophosphates, causing scaling and fouling of the aqueous systems treated. Because of this hydrolysis, excess quantities of the polyphosphates must also be employed.

It is the object of this invention to provide a composition for treating aqueous systems to prevent corrosion of metal surfaces in contact therewith using water-soluble chromates and an organic phosphorous acid compound which does not significantly decompose to form alkali earth metal phosphate precipitates, scale, and the like.

The process of this invention is useful with a wide variety of aqueous systems, that is, any corrosive aqueous system in contact with metal surfaces. Suitable systems which can be treated according to this invention include cooling towers, water circulating systems, and the like wherein fresh water, brines, sea water, sewage effluents, industrial waste waters, and the like are circulated in contact with metal surfaces. Pickling and metal cleaning baths can also be treated according to the process and composition of this invention. The process of this invention is suitable for reducing the corrosion of ferrous metals, copper, aluminum, brass, zinc, and alloys containing these metals which are in contact with the corrosive aqueous system.

The composition of this invention is a stable corrosion inhibiting composition containing an inorganic water-soluble chromate and an organic phosphorous acid compound. Concentrations in the composition are stated as weight percents, and concentrations in the aqueous systems treated are stated as parts per million unless otherwise specified.

The water-soluble inorganic chromate is a chromate or dichromate, preferably an alkali metal chromate or dichromate, and is provided in the composition in concentrations of from 1 to 60 and preferably from 10 to 40% based on the combined weight of the chromate and phosphorous acid compound. Suitable chromates for use in the composition and process of this invention include sodium dichromate dihydrate, anhydrous sodium chromate, sodium chromate tetrahydrate, sodium chromate hexahydrate, sodium chromate decahydrate, potassium dichromate, potassium chromate, ammonium dichromate, and chromic acid. In other words, the chromium compound used is any water-soluble hexavalent compound of chromium.

The composition of this invention contains from 40 to 99 and preferably from 60 to 90% of an organic phosphorous acid compound based on the combined weight of the chromate and phosphorous acid compound. The organic phosphorous acid has the formula:

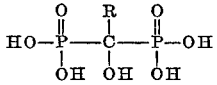

wherein R denotes an alkyl group having from 1 to 5 carbon atoms. The composition of this invention, alternatively can contain alkali metal, alkali earth metal, zinc, cobalt, chromium, lead, tin, nickel, ammonium, or ethanolamine salts of the organic phosphorous acid. Also the mono- or dialkyl esters of aliphatic alcohols having from 1 to 4 carbon atoms such as esters of methanol, ethanol, propanol, or butanol of the organic phosphorous acid can be employed. All of these compounds are included within the meaning of the term, organic phosphorous acid compound.

The organic phosphorous acid and salts and esters thereof have been previously disclosed in Patent No. 3,214,454. These acylation products can be produced, for example, by reacting phosphorous acid with acid anhydrides and/or acid chlorides, especially those of acetic, propionic, butyric, valeric, and caproic acid. When both the anhydride and the chloride are used simultaneously, they must be derived from the same acid; for example, the anhydride and the chloride of acetic acid can be used simultaneously, but not acetic anhydride together with propionic chloride. In lieu of phosphorous acid and one of the acid chlorides named above, phosphorous trichloride can be reacted directly with one of the carboxylic acids. The reaction products of phosphorous acid with acetic anhydride, with acetyl chloride, or with a mixture thereof are readily available. The reactions are usually carried out at elevated temperatures, preferably between 50 and 200° C.

The acylation products of phosphorus acid, depending upon the process whereby they are manufactured, are obtained in pure form, but frequently in the form of mixtures. All products obtained contain at least two phosphorous atoms in their molecules. The organic phosphorous acid can be represented by the formula

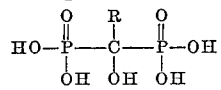

wherein R denotes a lower alkyl radical having from 1 to 5 carbon atoms. When mixtures are obtained, the products also have the above formula but the hydroxyl groups are partially esterified. The acyl group, in that case, corresponds to the carboxylic acid component used in the reaction. Furthermore, two or more molecules of the above formula may convert into the corresponding intermolecular anhydrides while splitting off water, and thus may be present together with the compound conforming to the formula above.

The organic phosphorous acid salts can be obtained by reacting the organic phosphorous acid with a sufficient quantity of the hydroxides; carbonates or bicarbonates of sodium, potassium, ammonium; or mono-, di-, and triethanol amines. This neutralization reaction can involve a full or partial substitution of the acid hydrogen atoms by sodium, potassium, or ammonium groups. The maximum exchange is that of four hydrogen atoms, namely those hydrogen atoms which are connected by way of the oxygen to an atom of phosphorous.

The organic phosphorous acid salts can also include salts of metallic cations such as magnesium, zinc, cobalt, chromium, lead, tin and nickel. In addition, the corrosion inhibiting effectiveness of the organic phosphorus acid compounds in some instances can be increased by mixing such phosphorous compounds with cupric chloride.

The esters of the organic phosphorous acid compound can be obtained by esterifying the phosphorous acid with lower aliphatic alcohols, preferably ones having from 1 to 4 carbon atoms such as methanol, ethanol, propanol, and butanol.

The chromate and organic phosphorous acid compound can be a mixed powder, granulated particles, a solution and the like. The solids can be added together as a briquette made, for example, by molding together particles of the chromate and organic phosphorous acid compound with any suitable conventional binder. Suitable binders include hydrated lime, sodium sulfate, sodium metasilicate, zinc sulfate, and the like.

The composition of this invention can also contain dispersing agents, pH regulating agents, microbicides, and the like.

The process of this invention is a method for treating water to prevent corrosion of metal surfaces in contact therewith comprising maintaining in the water from 0.1 to 200 p.p.m. of a water soluble inorganic chromate and from 0.1 to 400 p.p.m. of the organic phosphorous acid compound described above. Preferably, from 5 to 40 p.p.m. of the water soluble inorganic chromate and from 10 to 80 p.p.m. of the organic phosphorous acid compound is maintained in the water.

The treatment compositions employed in the process of this invention can be added to the water by conventional bypass feeders using briquettes containing the treatment, by adding the chromate and organic phosphorous compounds either separately or together as dry powder mixtures to the water, or it can be fed as an aqueous feed solution containing one or both of the treatment components.

The organic phosphorous acid compounds employed in the composition and process of this invention exhibit unexpected stability in briquettes and solutions containing the chromates. Furthermore, substantially no degradation of the organic phosphorous acid components to orthophosphates occurs in the feed compositions and systems treated.

The invention is further illustrated by the following specific but non-limiting examples.

Example 1

This example demonstrates the synergistic reduction in corrosion rate obtained with the composition of this invention.

In this test, circulating water having the following composition was uesd.

| | |
|---|---|
| Demineralized water _____gal__ | 50 |
| Calcium sulfate _____g__ | 84.0 |
| Magnesium sulfate heptahydrate _____g__ | 98.0 |
| Sodium bicarbonate _____g__ | 35.0 |
| Calcium chloride _____g__ | 25.7 |

During the test, the circulating water was fed to a closed circulating test system at a rate of 5 gal. per day the overflow from the test system being discharged to waste.

In the closed circulating system, circulating water having a temperature of 130° F. was fed at a rate of one gal. per minute to a coupon chamber containing test coupons for the corrosion test. Water from the coupon chamber was then passed through an arsenical admiralty brass tube for a scaling test; the tube was surrounded by a jacket through which a heating liquid having an initial temperature of 240° F. was countercurrently passed. The circulating water was then cooled to 130° F. and recirculated through the system. The total circulating time for each test was 10 days.

Mild steel, brass (33 wt. percent zinc), copper and aluminum coupons having an average area of 26.2 cm.² were used in the test chamber. The coupons were carefully cleaned and weighed before use. Following the test, each coupon was cleaned with inhibited hydrochloric acid, rinsed, dried and weighed to determine the corrosion rate in mils per year.

Following each test the admiralty brass tube was removed and split; scale from representative areas of the tube interior was removed and weighed to determine the weight gain per unit area due to scaling.

In Test A, untreated circulating water was tested. In Run B and Run C, the circulating water was treated with sodium dichromate and hydroxy ethylidene diphosphonic acid, respectively. In Run D, the circulating water was treated with both the chromate and phosphorous acid compound.

The results obtained are shown in Table A.

TABLE A

| Run No | A | B | C | D |
|---|---|---|---|---|
| Additive concentration, p.p.m.: | | | | |
| Sodium dichromate | 0 | 4 | 0 | 4 |
| Hydroxy ethylidene diphosphonic acid. | 0 | 0 | 8 | 8 |
| Corrosion rate, mils per year: | | | | |
| Steel | 15.0 | 11.9 | 14.9 | 2.5 |
| Brass | 3.0 | 2.7 | 2.5 | 1.0 |
| Copper | 2.0 | 2.0 | 1.7 | 0.6 |
| Aluminum | 11.0 | 3.4 | 14.0 | 1.8 |
| Scaling rate, mg./in.² day | 0.439 | 0.246 | 0.403 | 0.010 |

As shown in Table A, a synergistic corrosion rate reduction was observed with each of the metals tested when the circulating water was treated according to this invention. The combination of the chromate and organic phosphorous acid compound was better than would be expected from the results obtained using the compounds alone. Furthermore, synergistic scale reduction was also observed.

Example 2

The following compositions according to this invention show similar unexpected corrosion reductions when tested by the procedure described in Example 1.

Liquid Composition A

| Component: | Concentration, weight percent |
|---|---|
| Sodium dichromate dihydrate | 0.5 |
| Hydroxy ethylidene diphosphonic acid | 5.0 |
| Sodium hydroxide | 2.0 |
| Water | 92.5 |

Liquid Composition B

| Component: | |
|---|---|
| Potassium dichromate | 0.5 |
| Hydroxy propylidene diphosphonic acid | 4.0 |
| Sodium hydroxide | 2.5 |
| Water | 93.0 |

Liquid Composition C

| Component: | |
|---|---|
| Sodium chromate | 1.0 |
| Hydroxy ethylidene diphosphonic acid | 1.0 |
| Potassium hydroxide | 2.5 |
| Water | 95.5 |

Solid Composition D

| Component: | |
|---|---|
| Sodium dichromate | 1.0 |
| Sodium metasilicate pentahydrate | 97.0 |
| Hydroxy butylidene diphosphonic acid | 2.0 |

Solid Composition E

| Component: | |
|---|---|
| Sodium dichromate dihydrate | 0.2 |
| Hydrated lime | 15.0 |
| Sodium sulfate | 77.8 |
| Hydroxy ethylidene diphosphonic acid | 7.0 |

Solid Composition F

| Component: | |
|---|---|
| Potassium dichromate | 1.0 |
| Sodium metasilicate | 20.0 |
| Sodium sulfate | 69.0 |
| Zinc salt of hydroxy ethylidene diphosphonic acid | 10.0 |

Obviously many modifications and variations of the invention as hereinabove set forth can be made without departing from the essence and scope thereof, and only such limitations should be made as are indicated in the claims.

The invention claimed is:

1. A stable corrosion inhibiting composition consisting essentially of from 1 to 60 weight percent of a water-soluble hexavalent inorganic chromate corrosion inhibitor and from 40 to 99 weight percent, based on the combined weight of the organic phosphorous acid compound and the chromate, of a water-soluble organic phosphorous acid compound selected from the group consisting of an organic phosphorous acid having the formula:

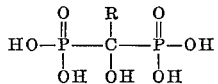

wherein R denotes an alkyl group having from 1 to 5 carbon atoms; alkali metal, alkali earth metal, zinc, cobalt, chromium, lead, tin, nickel, ammonium, and ethanolamine salts of said phosphorous acid; mono- and dialkyl esters thereof with an aliphatic alcohol having from 1 to 4 carbon atoms; and mixtures thereof.

2. The composition of claim 1 containing from 10 to 40 weight percent of the water-soluble hexavalent inorganic chromate corrosion inhibitor.

3. The composition of claim 1 containing from 60 to 90 weight percent of the organic phosphorous acid compound.

4. A process for treating water to prevent corrosion of metal surfaces in contact therewith comprising maintaining in the water from 0.1 to 200 p.p.m. of a water-soluble hexavalent inorganic chromate corrosion inhibitor and from 0.1 to 400 p.p.m. of an organic phosphorous acid compound selected from the group consisting of an organic phosphorous acid having the formula $$HO-\overset{O}{\underset{OH}{\overset{\|}{P}}}-\overset{R}{\underset{OH}{C}}-\overset{O}{\underset{OH}{\overset{\|}{P}}}-OH$$

wherein R denotes an alkyl group having from 1 to 5 carbon atoms; alkali metal, alkali earth metal, zinc, cobalt, chromium, lead, tin, nickel, ammonium, and ethanolamine salts of said organic phosphorous acid; and mono- and dialkyl esters thereof with an aliphatic alcohol having from 1 to 4 carbons; and mixtures thereof.

5. The process of claim 4 wherein from 5 to 40 p.p.m. of the water-soluble inorganic chromate corrosion inhibitor is maintained in the water.

6. The process of claim 4 wherein from 10 to 80 p.p.m. of the organic phosphorous acid compound is maintained in the water.

References Cited

UNITED STATES PATENTS

| 2,711,391 | 6/1955 | Kahler | 252—387 |
| 3,214,454 | 10/1965 | Blaser et al. | 260—932 |
| 3,297,578 | 1/1967 | Crutchfield et al. | 252—89 |

OTHER REFERENCES

Bregman: Corrosion Inhibitors, MacMillan, 1963, chapter 2, pp. 44–45.

LEON D. ROSDOL, *Primary Examiner.*

I. GLUCK, *Assistant Examiner.*

U.S. Cl. X.R.

21—2.7; 252—175, 387